Sept. 1, 1970    J. TROLL    3,526,772
FLUID ANALYZER USING FILTER MOSAIC AND VIDICON
Filed June 12, 1968
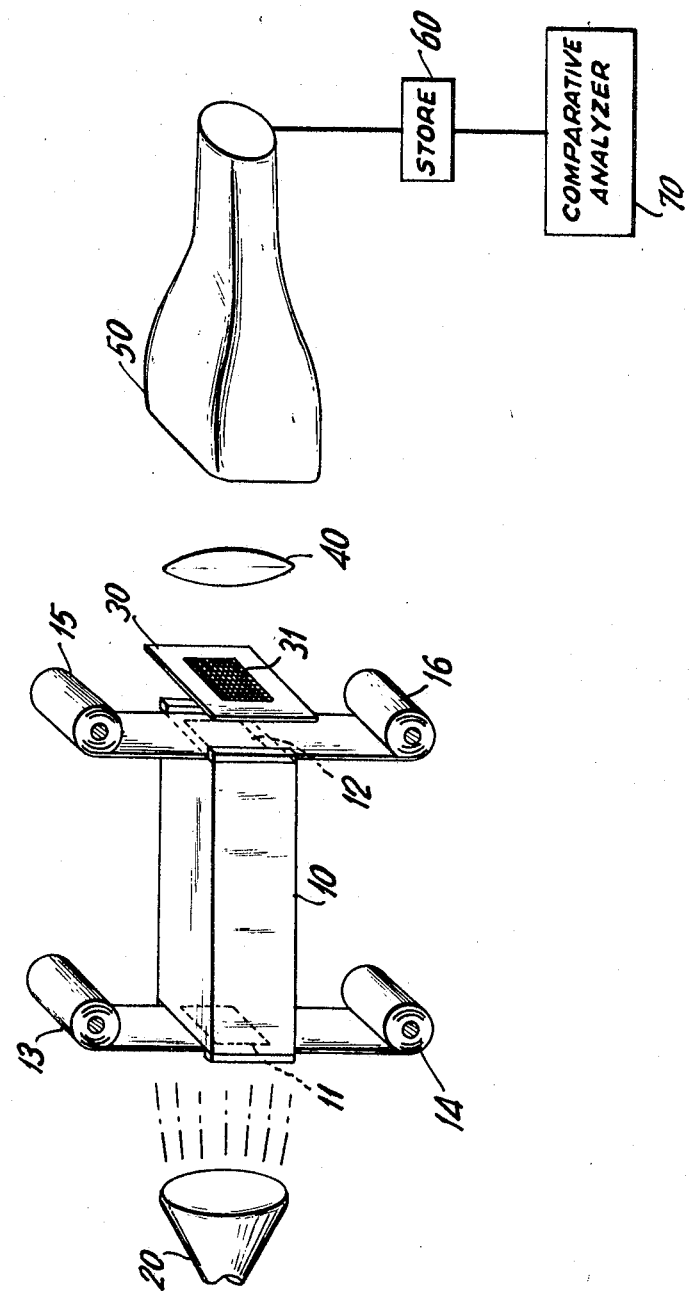
INVENTOR.
JOHN TROLL
BY
Hopgood & Calimafde
ATTORNEYS

3,526,772
FLUID ANALYZER USING FILTER MOSAIC AND VIDICON
John Troll, Ridgefield, Conn., assignor to Ovitron Corporation, Cheshire, Conn., a corporation of Delaware
Filed June 12, 1968, Ser. No. 736,447
Int. Cl. G01n *21/24*
U.S. Cl. 250—218         5 Claims

ABSTRACT OF THE DISCLOSURE

A sample of fluid is conducted between a pair of transparent windows and is illuminated by a source of light having a predetermined spectrum band. The light source is viewed by a vidicon after passing through the two windows and a filter mosaic having variable pass band characteristics over its surface. The output of the vidicon is a function of the filter characteristics and the sample fluid.

BACKGROUND OF INVENTION

Methods for quantitatively and qualitatively analyzing the constituents of gases and liquids (hereinafter generically fluids) vary from the mechanical process of chemically breaking down and anlayzing samples, to sophisticated spectral analyzers which exist in almost infinite variety. Conventional systems, however, of either the former or the latter type suffer from serious disadvantages which manifest themselves in chemical processes by the slowness of the process and in spectral analysis by the cost of equipment.

Accordingly, it is the object of this invention to provide an arrangement which simply and expeditiously analyzes the constituents of fluids, both qualitatively and quantitatively and which does so economically and quickly.

BRIEF SUMMARY OF THE INVENTION

Briefly, the invention is predicated upon the concept of locating a fluid sample between a source of light having a predetermined spectrum band and a filter having surface variable characteristics. A vidicon scans the filter, and the output is a time variable signal which is a function of the particular filter component in the sample fluid.

The above mentioned and other features and objects of this invention and the manner of attaining them will become more apparent and the invention itself will best be understood by references to the following description of an embodiment of the invention taken in conjunction with the accompanying drawings, the description of which follows wherein the single figure schematically illustrates one embodiment of the invention.

DETAILED DESCRIPTION OF THE INVENTION

Turning now to the figure, the fluid sample to be analyzed is located within the tube-like structure 10. The ends of the tube 10 comprise windows 11 and 12 of a material having a pass band within the range of interest. An example of such material is polyethylene film which is transparent throughout most of the visible and infra-red spectrums. Preferably, where the sample fluid under analysis would tend to accumulate on windows 11 and 12, a clean surface may be either periodically or continuously obtained by means of the linearly advancing paired rollers of polyethylene 13, 14, 15, and 16.

While a specific tube 10 is shown for containing the sample, it will be appreciated by those skilled in the art that the tube itself may have no definable bounds, but may, for example, lie crossways of a large column of advancing gas. That is assuming gas to be flowing through a pipe, windows may be cut on opposing sides for purposes of analysis.

Positioned to illuminate window 11 is a source 20 launching electromagnetic waves in the spectrum of interest. Compatible with the acceptance spectrum of the vidicon and the windows. Juxtaposed to the second window 12 is a filter 30. This filter is specially prepared to have a variable pass band over its surface. This may be accomplished in many ways. For example, a mosaic of individual discrete filters may be arranged on a single plate along coordinate axes. In this manner 800 x 800 or 640,000 filters could be arranged on one surface using microprecision alignment. On the other hand, the filter may be formed to have a pass band which varies continuously from left to right or vertically or both.

In any event, the composite filter will preferably have a characteristic such that its coordinate will dictate the pass band at that particular point. While there may be some repetition throughout the coordinate structure, a great number of individual pass bands may be accommodated by filter 30. Each filter will be opaque or transparent to specific wave lengths. For example, a group of filter sections may pass only infra-red radiation which is subject to being attenuated by $SO_2$ gas. Thus, the sulphur dioxide content between the two windows would be detected qualitatively by the change in the filter outputs of that group (these filters would represent the $SO_2$ "signature"), and quantitatively by the amount of the change. Other gases would take a different combination of filters to effect a reading of the gas constituent. Alternatively, the filter mosaic may be made up of chambers containing controlled samples of fluids to effect a similar result.

Lens 40 transfers the filter display to the face of vidicon 50. Vidicon 50 may be the conventional type having 600 line resolution and being small in size and simple in construction. It consists of a signal electrode composed of a transparent conducting film on the inner surface of the face plate and a thin layer of photo-conductive material deposited on the signal electrode. Screens, grids and electromagnetic field producing means would also be included for effecting the scan and so on.

Each elemental area of the photoconductor can be likened to a leaky capacitor with one plate electrically connected to the signal electrode and the other floating except when commutated by the electron beam. During a frame time, i.e., during a complete sweep of the vidicon face (which is equivalent to the complete sweep of the face of the filter) the capacitors would discharge in accordance with the value of their leakage resistance which in turn would be determined by the amount of electromagnetic energy falling on that elemental area.

Thus, the signal output from the vidicon would represent a plurality of horizontal sweepings progressing either filter. The vidicon output would, therefore, be a time variable response whose amplitude depends upon the particular filter section involved and the fluid sample. The vidicon output may now be supplied to some storage device 60 (for example a high resolution magnetic tape) to be later or simultaneously fed into a comparative analyzer 70 where the information obtained is treated by computer logic in order to ascertain the constituents in their respective quantities.

While the principles of the invention have been described in connection with specific apparatus, it is to be clearly understood that this description is made only by way of example, and not as a limitation to the scope of the invention as set forth in the objects thereof and in the accompanying claims.

For example, it is possible to use different light sources in conjunction with specific filter arrangements, or even a blinking source so long as a polyfrequency analysis is being made linearly as a function of time.

What is claimed is:

1. A fluid analyzer comprising:
   a source of light having a radiation band in the spectrum from infra-red to ultra-violet;
   a planar filter having a pass band variable over its surface and within the range of said source;
   means for locating a fluid sample between said source and said filter;
   and a vidicon disposed to scan said filter from the side opposite said sample, whereby the vidicon output is a time function of the filter characteristics and said sample.

2. The fluid analyzer claimed in claim 1, wherein the filter comprises a mosaic array of discrete filter portions, each having distinct characteristics.

3. The fluid analyzer as claimed in claim 2, wherein said filter portions are coordinately disposed with respect to one another vertically and horizontally.

4. A fluid analyzer as claimed in claim 1, wherein said means for locating said fluid sample comprises a pair of windows located along the same light axis and containing said sample therebetween.

5. The fluid analyzer claimed in claim 4, wherein said windows comprise elongated transparent film, and means for translating said film across an aperture in the body containing said fluid.

References Cited

UNITED STATES PATENTS

| 2,444,560 | 7/1948 | Feldt et al. | 356—83 |
| 2,648,253 | 8/1953 | Sweet | 356—45 |
| 2,690,093 | 9/1954 | Daly | 250—218 |
| 2,793,560 | 5/1957 | Rennick | 356—83 |

ARCHIE R. BORCHELT, Primary Examiner

M. ABRAMSON, Assistant Examiner

U.S. Cl. X.R.

250—226; 356—180, 185, 186